United States Patent
Robertson, Jr. et al.

(10) Patent No.: US 12,510,383 B2
(45) Date of Patent: Dec. 30, 2025

(54) SENSOR ASSEMBLY

(71) Applicant: Ford Global Technologies, LLC, Dearborn, MI (US)

(72) Inventors: Michael Robertson, Jr., Garden City, MI (US); Segundo Baldovino, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 18/325,287

(22) Filed: May 30, 2023

(65) Prior Publication Data

US 2024/0401990 A1    Dec. 5, 2024

(51) Int. Cl.
| | |
|---|---|
| *B60S 1/56* | (2006.01) |
| *B60S 1/52* | (2006.01) |
| *B60S 1/54* | (2006.01) |
| *G01D 11/24* | (2006.01) |

(52) U.S. Cl.
CPC .............. *G01D 11/245* (2013.01); *B60S 1/52* (2013.01); *B60S 1/54* (2013.01); *B60S 1/56* (2013.01)

(58) Field of Classification Search
CPC . G01D 11/245; B60S 1/52; B60S 1/54; B60S 1/56
See application file for complete search history.

(56) References Cited

U.S. PATENT DOCUMENTS

| | | | |
|---|---|---|---|
| 9,707,896 B2* | 7/2017 | Boegel | B05B 7/00 |
| 2009/0250533 A1* | 10/2009 | Akiyama | B60S 1/381 |
| | | | 239/284.1 |
| 2021/0362688 A1* | 11/2021 | Kawamura | B60S 1/486 |
| 2023/0256941 A1* | 8/2023 | Sviberg | B60R 11/04 |
| | | | 239/284.1 |

FOREIGN PATENT DOCUMENTS

| | | | | |
|---|---|---|---|---|
| CN | 112977275 A | * | 6/2021 | |
| JP | 2014000949 A | | 1/2014 | |
| WO | WO-2023030809 A1 | * | 3/2023 | B60S 1/52 |

* cited by examiner

*Primary Examiner* — Jamel E Williams
(74) *Attorney, Agent, or Firm* — Frank A. MacKenzie; Brooks Kushman P.C.

(57) ABSTRACT

A sensor assembly includes a housing shaped to be mounted to a vehicle. The sensor assembly includes a first nozzle positioned on the housing and below the sensor and is positioned to dispense a fluid in an upward direction to a surface of the sensor. The sensor assembly includes a second nozzle positioned below the sensor, in which the second nozzle is positioned to dispense airflow to the surface of the sensor. The sensor assembly further includes a ram air structure positioned to receive airflow during forward travel of the vehicle and to dispense airflow to the surface of the sensor.

23 Claims, 4 Drawing Sheets

SENSOR ASSEMBLY

BACKGROUND

Autonomous and semi-autonomous vehicles typically include a variety of sensors, such as sensors to detect objects external to the vehicle. Such sensors can include, for example, radar sensors, scanning laser range finders, light detection and ranging (lidar) devices, and imaging sensors such as cameras. A sensor may utilize a cover or a lens, which may be susceptible to an accumulation of dust, dirt, and/or other obscurants.

DETAILED DESCRIPTION

Figure 1:
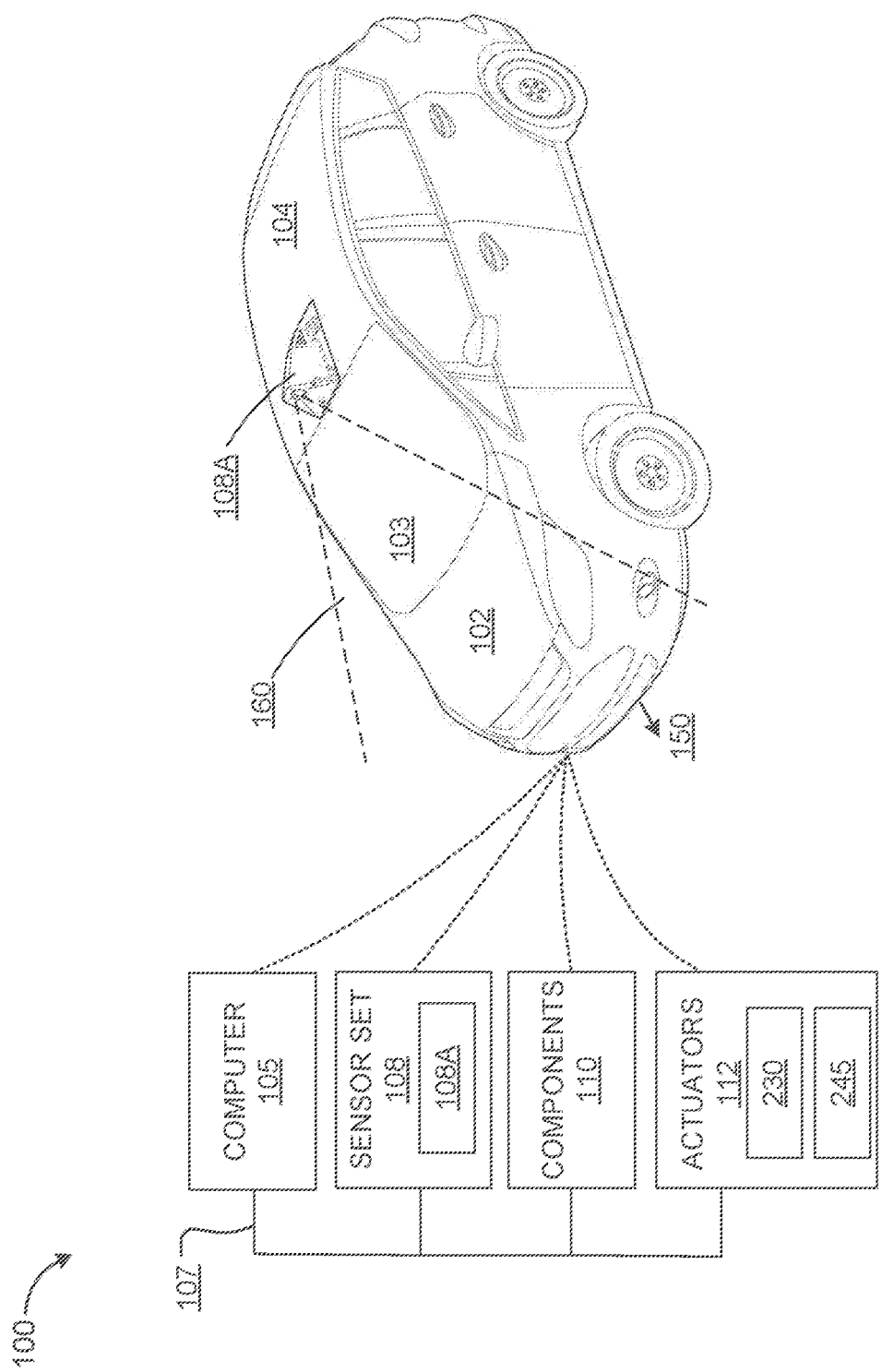
FIG. 1 is a block diagram of an example vehicle system.

An assembly can include a housing shaped to be mounted to a vehicle. The assembly can additionally include a sensor within the housing, the sensor having a field of view in a forward direction relative to the vehicle. The assembly can additionally include a first nozzle, positioned on the housing and below the sensor, to dispense a fluid in an upward direction to a surface of the sensor. The assembly can include a second nozzle, positioned below the sensor, to dispense airflow to the surface of the sensor. The assembly can further include a ram air structure positioned to receive airflow during forward travel of the vehicle and to dispense the received airflow to the surface of the sensor.

In an example, the surface of the sensor can include a lens.

In an example, the second nozzle and the ram air structure can be isolated from each other.

In an example, the assembly can additionally include a drain port positioned within the housing and below the sensor.

In an example, the assembly can additionally include a drain port mounted within the housing and below the sensor, in which the drain port is sized to permit accumulated liquid to drain from the housing.

In an example, the ram air structure of the sensor can be positioned to receive airflow deflected from a windshield of the vehicle prior to dispensing the airflow.

In an example, the ram air structure is located at a forward edge of the housing.

In an example, the ram air structure can be positioned below the surface of the sensor to dispense the airflow in an upward direction to the surface of the sensor.

In an example, the ram air structure can include an outlet duct having a reduced cross-sectional area proximate to the surface of the sensor with respect to a cross-sectional area of a collector duct of the ram air structure.

In an example, the ram air structure can be mounted above a windshield of the vehicle, the windshield having a rake angle of between 24° and 42°. The ram air structure can include a collector duct having a cross-sectional area sufficient to dispense airflow at an outlet duct at a speed of between 7 meters/second and 13 meters/second when the vehicle is traveling at 70 kilometers/hour.

In an example, the assembly can additionally include a fan positioned to supply cooling air to the sensor that exits through an outlet air vent of the housing, and the fan can include a tap to supply airflow to the second nozzle aimed at the surface of the sensor.

In an example, the assembly can additionally include a fan activatable to supply cooling airflow to the sensor at all speeds of the vehicle.

In an example, the assembly can additionally include a fan mounted at a rearward location with respect to the sensor and coupled to an outlet air vent, the fan can be coupled to a controller programmed to instruct the fan to rotate at a rotational speed based on a speed of the vehicle.

In an example, the assembly can additionally include a fan mounted at a rearward location with respect to the sensor and coupled to an outlet air vent, the fan can be coupled to a controller programmed to instruct the fan to rotate at a rotational speed that decreases responsive to a speed of the vehicle increasing.

In an example, the assembly can additionally include a fan mounted at a rearward location with respect to the sensor and coupled to an outlet vent, the fan can be coupled to a tap to direct airflow from the fan to the second nozzle.

In an example, the assembly can additionally include a fan positioned to draw airflow into the housing, the fan can additionally be coupled to a controller programmed to instruct the fan to draw the airflow into the housing based on a wheel speed of the vehicle and programmed to deactivate cleaning airflow from the fan to the sensor responsive to the vehicle attaining a threshold speed.

In an example, the assembly can additionally include a fan positioned to draw airflow into the housing, the fan additionally being coupled to a controller programmed to instruct the fan to draw the airflow into the housing based on a wheel speed of the vehicle and programmed to deactivate cleaning airflow from the fan to the sensor responsive to the vehicle attaining a threshold speed at which airflow from the ram air structure is greater than the airflow from the second nozzle.

In an example, the housing can be mounted adjacent to an upper boundary of a windshield of the vehicle.

In an example, the housing can be mounted proximate to a forward edge of the vehicle roof.

In an example, the first nozzle can be fluidly coupled to a windshield washer fluid reservoir.

With reference to the Figures, wherein like numerals indicate like parts throughout the several views, FIG. 1 is a block diagram of an example vehicle system 100. Vehicle body 102 of vehicle system 100 can correspond to that of any land vehicle, such as a car, truck, a sport utility vehicle, a crossover, a van, a minivan, a taxi, a bus, etc. Vehicle system 100 includes computer 105, which may utilize vehicle communications bus 107 to communicate with sensor set 108, vehicle components 110, actuators 112 (e.g., fan 230 of FIG. 2), etc. Sensor set 108 may include radar sensors, cameras (e.g., an infrared camera), lidar sensors, wheel speed sensors (e.g., wheel speed sensor 265 of FIG. 2), etc. Vehicle communications bus 107 can include an internal wired and/or wireless network, such as a controller area network (CAN) or the like, and/or other wired and/or wireless mechanisms. Vehicle computer 105 includes a processor and a memory, which can include one or more forms of computer-readable media, and stores instructions executable by vehicle computer 105 for performing various operations, including those disclosed herein.

Actuators 112 can be implemented via discrete circuits, integrated circuits, motors (e.g., stepper motors), fans (e.g., fan 230 of FIG. 2), pumps (e.g., pump 245 of FIG. 2), and/or other electronic and/or mechanical components that can actuate various vehicle subsystems in response to appropriate control signals. For example, actuators 112 may include fans utilized to dispense airflow to sensor lenses (e.g., sensor surface 205 of FIG. 2), sensor covers, or any other type of sensor surface, which may provide output data to computer 105.

In the context of the present disclosure, "activating," or forms thereof, is defined as bringing about an intended function in response to an electrical or mechanical stimulus. Thus, for example, as will be described in greater detail herein, a fan, such as fan 230 of FIG. 2, may be activated in response to an electrical stimulus, e.g., an applied voltage, a digital signal, etc., generated by computer 105. Also in the context of the present disclosure, "deactivating" or forms thereof, is defined as halting or stopping an intended function in response to an electrical or mechanical stimulus. Thus, a fan, e.g., fan 230, may be deactivated in response to an electrical stimulus, e.g., an applied voltage, digital signal, etc. In another example, a fan, e.g., fan 230, may be deactivated in response to an absence of an electrical or mechanical stimulus, such as a voltage drop from a first voltage to a ground or reference voltage.

In the example of FIG. 1, sensor 108A includes an infrared camera, which may be capable of observing and/or detecting objects within the field of view 160 in a forward direction relative to vehicle system 100. As vehicle system 100 of FIG. 1 proceeds along path 150, surfaces of sensor set 108, which includes sensor 108A mounted to the roof of vehicle system 100, may be susceptible to an accumulation of dust, dirt, and other debris encountered in the driving environment of vehicle system 100. Such debris may potentially obscure at least a portion of the sensor surfaces. Hence, to prevent or preclude degradations in sensor performance resulting from accumulation of debris on a surface of sensor 108A, computer 105 may initiate a sensor surface cleaning process. Such process may involve computer 105 activating a windshield washing subsystem, in which one or more fluid pumps, e.g., 245 of FIG. 2, coupled to a fluid reservoir, e.g., 240, operate to dispense cleaning fluid on windshield 103 and/or other surfaces of the sensors of sensor set 108. In an example, activating a sensor surface cleaning process may involve the simultaneous cleaning of some or all surfaces of the sensors of sensor set 108.

In some instances, intermittent cleaning of surfaces of sensor set 108 can be supplemented by utilizing airflow obtained as a consequence of vehicle system 100 proceeding along path 150. Thus, in an example, a surface of sensor 108A, mounted within a housing (e.g., housing 250 of FIG. 2), may be supplementarily cleaned utilizing a ram air structure 220, described in greater detail in reference to FIGS. 2 and 3 herein. The ram air structure may be integrated into housing 250 and may operate to force airflow deflected from windshield 103 across a surface (e.g., sensor surface 205 of FIG. 2) of sensor 108A, thereby providing continuous sensor surface cleaning as vehicle system 100 proceeds along path 150. Alternatively, or in addition, in response to vehicle system 100 traveling along path 150 below a threshold speed, fan 230 of FIG. 2 may generate an airflow for dispensing to sensor surface 205 by way of first nozzle 210.

Vehicle system 100 includes vehicle body 102. Vehicle 102 may be of a unibody construction, in which a frame and body of vehicle system 100 are a single component. Vehicle system 100 may, alternatively, be of a body-on-frame construction, in which the frame supports body 102 that is a separate component from the frame. The frame and body 102 may be formed of any suitable material, for example, steel, aluminum, etc.

Figure 2:
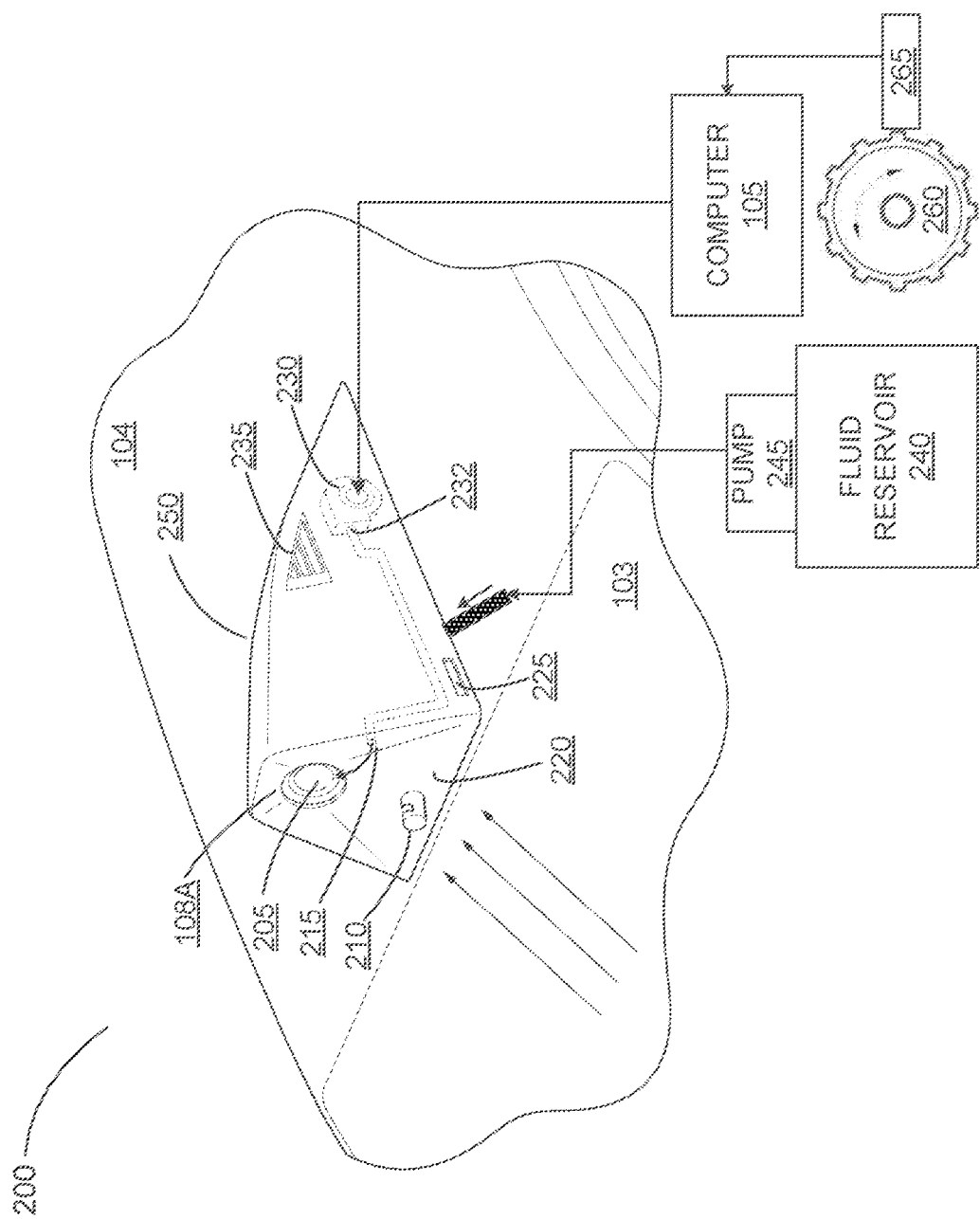
FIG. 2 is perspective view of portion of a vehicle body that includes a sensor assembly.

FIG. 2 is perspective view of a portion of vehicle 102 that includes sensor assembly 200 and components of vehicle system 100. Sensor assembly 200 of FIG. 2 may include housing 250, which may operate to protect sensor 108A from exposure to rain, sun loading, etc. Housing 250 may be mounted to the roof 104 of vehicle 102. Sensor 108A, mounted within housing 250, may include sensor surface 205, which may be prone to an accumulation of dust, dirt, insects, mud, or other obscurants as vehicle 102 travels in a forward direction. Housing 250 may include first nozzle 210 located below sensor surface 205, which may operate to dispense, for example, windshield washer fluid from windshield washer fluid reservoir 240 responsive to activation of pump 245. Pump 245 may be activated by a human operator of vehicle system 100 or may be operated by computer 105. Housing 250 may include drain port 225 located below sensor 108A. Drain port 225 may be sized to permit any accumulated liquid to drain from housing 250, thereby maintaining a dry operating environment of sensor 108A.

The sensor assembly of FIG. 2 may additionally include fan 230 mounted within housing 250. Fan 230 may operate to draw cooling airflow into housing 250 and to permit the cooling airflow to circulate within the housing. After circulating within housing 250, cooling airflow may exit housing 250 via outlet air vent 235. As seen in FIG. 2, outlet air vent 235 may be located at a top and rearward portion of housing 250. In an example, fan 230 may operate at all times while vehicle 102 is in motion so as to generate a cooling airflow sufficient to maintain sensor 108A within operating temperature limits. In an example, fan 230 may be activated in response to receiving a stimulus from computer 105 indicating motion of vehicle 102. In an example, fan 230 may operate at a rotational speed based on a speed of vehicle 102. Thus, in an example, when vehicle 102 comes to a stop, fan 230 may operate at a relatively high rotational speed. As vehicle 102 increases in speed, computer 105 may direct fan 230 to operate at a relatively lower rotational speed, thus permitting cooling of sensor 108A to be affected via motion of vehicle 102. Computer 105 may determine the speed of vehicle 102 based on an output data from wheel speed sensor 265. Wheel speed sensor 265 may, in one example, include a Hall effect sensor, which may generate a voltage responsive to a changing magnetic field in response to the motion of gear 260. Gear 260 may be coupled to one or more wheels of vehicle 102 so as to rotate responsive to rotation of the one or more wheels of the vehicle.

Fan 230 may include tap 232, which can be positioned to direct airflow from fan 230 to second nozzle 215 located below sensor surface 205. In this context, a "tap" is defined as a device to control or direct a flow of a gas from a source. Accordingly, tap 232 of fan 230 may include a valve, a regulator, or an opening that permits air to be directed from fan 230 to second nozzle 215. Thus, via the operation of fan 230, second nozzle 215 may dispense airflow to sensor surface 205. Accordingly, while fan 230 operates, sensor surface 205 may be prevented from accumulating dust, dirt, or other obscurants that may degrade the performance of sensor 108A. In an example, tap 232 may transport a majority, e.g., between 60% and 90%, of airflow generated by fan 230 to second nozzle 215. Accordingly, the remaining portion of airflow generated by fan 230, e.g., between 10% and 40%, may be utilized as cooling airflow to maintain sensor 108A within operating temperature limits.

As seen in FIG. 2, housing 250 can be located above an area encompassed by windshield 103 so as to receive airflow deflected in an upward direction from windshield 103. Housing 250 may include ram air structure 220, described in greater detail in reference to FIG. 3, which may operate to collect deflected airflow from windshield 103 while vehicle 102 is in motion. Thus, while vehicle 102 is in motion, sensor surface 205 may be prevented from accumulating dust, dirt, or other obscurants that may degrade the performance of sensor 108A. In an example, when vehicle 102 attains a threshold speed, such as a speed sufficient for ram air structure 220 to supply an airflow that is greater than airflow dispensed by second nozzle 215, computer 105 may instruct fan 230 to deactivate generation of airflow through tap 232 to sensor surface 205. Accordingly, sensor surface 205 may be kept free of dust, dirt, or other obscurants via airflow deflected from windshield 103 and through ram air structure 220.

Figure 3:
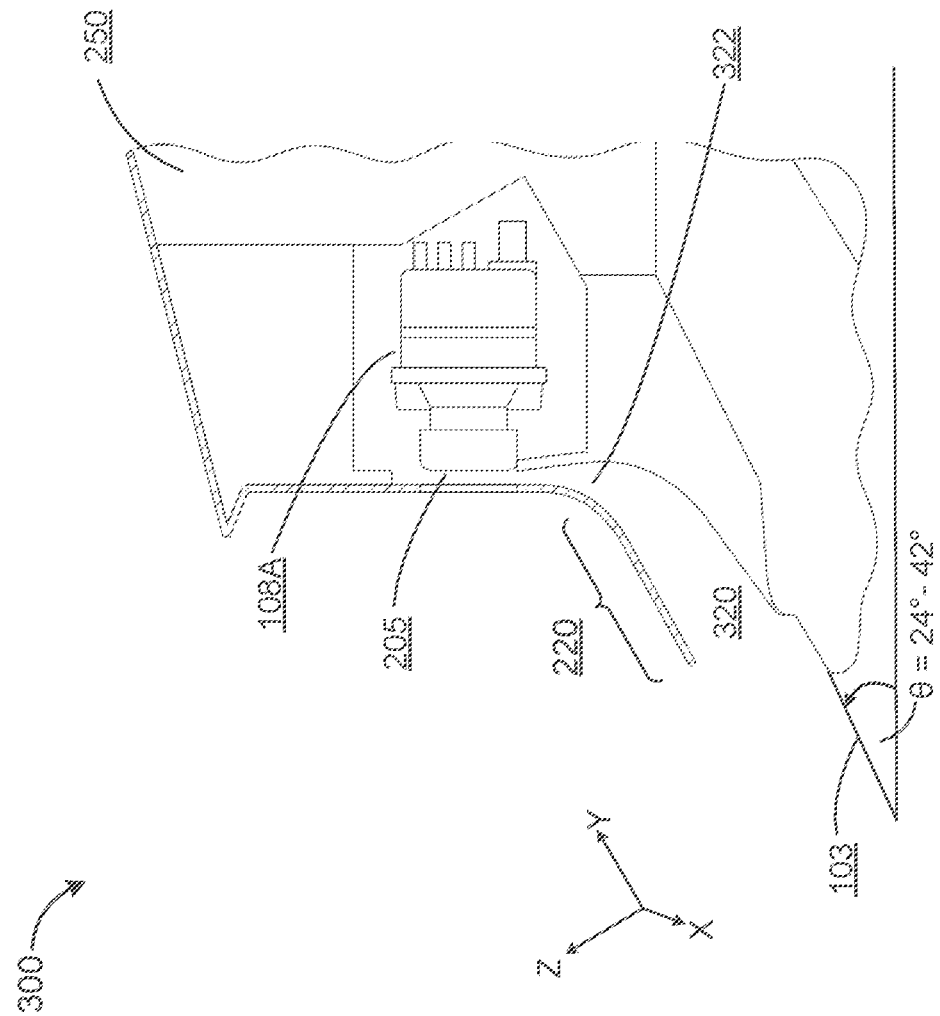
FIG. 3 shows a cross-sectional view of a portion of a sensor assembly.

FIG. 3 shows a cross-sectional view of a portion of a sensor assembly 300. As seen in FIG. 2, ram air structure 220 may include collector duct 320 and outlet duct 322. In an example, ram air structure 220 and second nozzle 215 may be isolated from each other. Collector duct 320 may be located at an upper edge of windshield 103. Accordingly, during motion of vehicle 102, airflow deflected from windshield 103 may enter collector duct 320. Via narrowing of the channel connecting collector duct 320 and outlet duct 322, deflected airflow may increase in velocity, thereby providing airflow at outlet duct 322 having a velocity sufficient to remove obscurants from sensor surface 205. Collector duct 320 of ram air structure 220 may be sized in accordance with a rake angle of windshield 103. In the example of FIG. 2, a rake angle of windshield 103 of between 24° and 42° may provide sufficient airflow, generated responsive to vehicle 102 being in motion, to remove a variety of obscurants from sensor surface 205. In one example, ram air structure 220, mounted above windshield 103 having a rake angle of between 24° and 42° can dispense airflow at outlet duct 322 at a speed of between 7 m/s and 13 m/s in response to vehicle 102 traveling at 70 kilometers per hour. In an example, collector duct 320 of ram air structure 220 may include a cross-sectional area having a first dimension measured along a first axis, e.g., a width in a cross-vehicle direction (the "x" direction shown in FIG. 3), of between 65 mm and 115 mm. Collector duct 320 may include a second dimension measured along a second axis orthogonal to the first axis, e.g., a height perpendicular to a direction of airflow (the "z" direction shown in FIG. 3), of between 15 mm and 30 mm.

Figure 4:
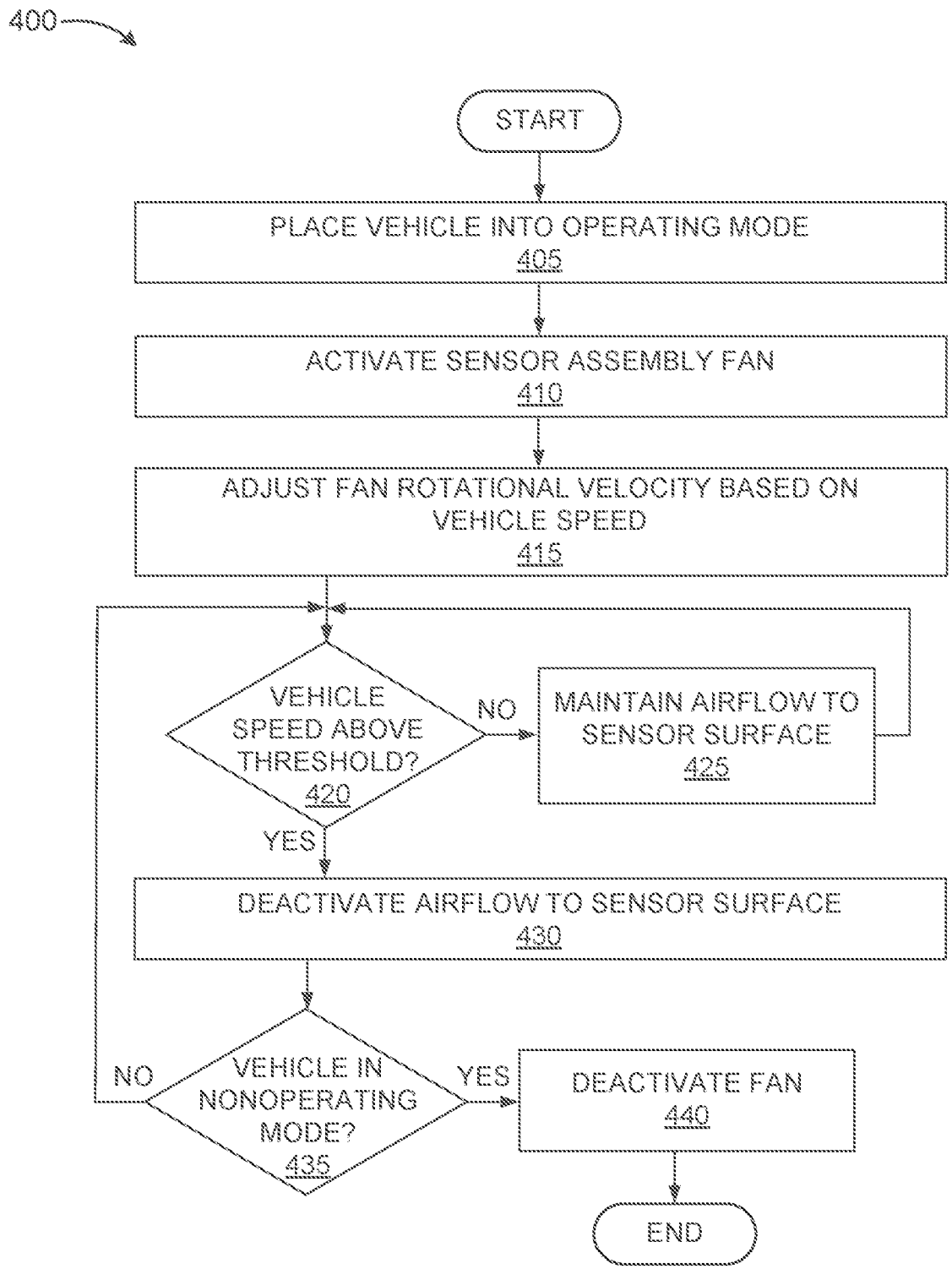
FIG. 4 is a flowchart of an example process for operating a sensor assembly.

FIG. 4 is a flowchart of an example process for operating a sensor assembly. Process 400 can be performed via programming of computer 105, which may operate to control operations of fan 230 responsive to vehicle 102 being placed in an operating mode, which may include activating a propulsion control of vehicle 102, e.g., shifting from park to drive, etc. While vehicle 102 is operated, fan 230 may circulate cooling airflow as well as airflow for cleaning sensor surface 205 of sensor 108A. As vehicle 102 moves in a forward direction, i.e., along path 150, computer 105 may adjust the rotational speed of fan 230. In an example, in response to vehicle 102 increasing in speed, computer 105 may decrease the rotational speed of fan 230. In response to vehicle 102 decreasing in speed, computer 105 may increase the rotational speed of fan 230. In response to vehicle 102 reaching a threshold speed, computer 105 may deactivate airflow between fan 230 and first nozzle 210, thereby allowing sensor surface 205 to be continuously cleaned via airflow deflected from windshield 103, through ram air structure 220, and across sensor surface 205.

Process 400 begins at block 405, in which programming of computer 105 receives output data indicating that vehicle 102 has been placed into an operating mode. An operating mode may include shifting from park to drive, placing the vehicle into a mode that brings about propulsion of the vehicle, etc.

Process 400 may continue at block 410, in which computer 105 outputs a signal or other type of stimulus to activate fan 230 mounted within housing 250. A portion of the airflow generated by fan 230 may be circulated within housing 250, which may operate to cool sensor 108A, also mounted within housing 250. A portion of the airflow generated by fan 230 may additionally be conveyed to second nozzle 215, e.g., via tap 232, which may operate to dispense airflow to sensor surface 205.

Process 400 may continue at block 415 in which computer 105 receives an indication of the speed of vehicle 102, as the vehicle proceeds along path 150. In response to wheel speed sensor 265 indicating an increasing speed, computer 105 may decrease the rotational speed of fan 230. In response to the vehicle speed sensor indicating a decreasing speed, computer 105 may increase the rotational speed of fan 230. Control of the rotational speed of fan 230 based on vehicle speed may operate to maintain an environment of sensor 108A that is within thermal operating limits.

Process 400 may continue at block 420, in which computer 105 can determine whether vehicle 102 is presently operating at a speed above a threshold. In response to computer 105 determining that vehicle 102 is not presently operating at a speed above a threshold, the process may continue at block 425 at which computer 105 may direct fan 230 to maintain airflow dispensed to sensor surface 205 via second nozzle 215. After block 425, process 400 may return to block 420. In response to computer 105 determining that vehicle 102 is operating at a speed above the threshold, block 430 may be performed in which computer 105 may direct fan 230 to deactivate airflow dispensed to sensor surface 205 via second nozzle 215. Responsive to deactivating airflow through second nozzle 215, airflow deflected from windshield 103, directed or channeled through ram air structure 220, may be utilized to remove dust, dirt, or other obscurants from sensor surface 205.

Process 400 may continue at block 435, in which computer 105 may determine whether vehicle 102 has been placed into a nonoperating mode, which may include an operator setting a parking brake of vehicle 102, removing a key from the ignition receptacle of vehicle 102, turning vehicle system 100 off, etc. Responsive to vehicle 102 being placed into a nonoperating mode, process 400 may return to block 420 to continue controlling airflow.

Otherwise, process 400 may continue at block 440 in which, in response to vehicle 102 being placed in a nonoperating mode, computer 105 may deactivate fan 230.

After block 440, process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system, such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a housing shaped to be mounted to a vehicle;
    a sensor within the housing, the sensor having a field of view in a forward direction relative to the vehicle;
    a first nozzle mounted on the housing and below the sensor, the first nozzle being positioned to dispense a fluid in an upward direction to a surface of the sensor;
    a second nozzle mounted below the sensor, the second nozzle positioned to dispense airflow to the surface of the sensor;
    a ram air structure positioned to receive airflow during forward travel of the vehicle and to dispense airflow to the surface of the sensor; and
    a fan positioned to draw airflow into the housing, the fan additionally being coupled to a controller programmed to instruct the fan to draw the airflow into the housing based on a wheel speed of the vehicle and programmed to deactivate cleaning airflow from the fan to the sensor responsive to the vehicle attaining a threshold speed at which airflow from the ram air structure is greater than the airflow from the second nozzle.

2. The assembly of claim 1, wherein the surface of the sensor is a lens.

3. The assembly of claim 1, wherein the second nozzle and the ram air structure are isolated from each other.

4. The assembly of claim 1, further comprising:
    a drain port located within the housing and below the sensor.

5. The assembly of claim 1, wherein the ram air structure is positioned to receive airflow deflected from a windshield of the vehicle prior to dispensing the airflow.

6. The assembly of claim 1, wherein the ram air structure comprises a collector duct mounted above an area encompassed by a windshield of the vehicle.

7. The assembly of claim 1, wherein the ram air structure is located at a forward edge of the housing.

8. The assembly of claim 1, wherein the ram air structure includes an outlet duct having a reduced cross-sectional area proximate to the surface of the sensor with respect to a cross-sectional area of a collector duct of the ram air structure.

9. The assembly of claim 1, wherein the ram air structure is mounted above a windshield of the vehicle, the windshield having a rake angle of between 24° and 42°, and wherein the ram air structure includes a collector duct having a cross-sectional area sufficient to dispense airflow at an outlet duct at a speed of between 7 meters per second and 13 meters per second when the vehicle is traveling at 70 kilometers per hour.

10. The assembly of claim 1,
wherein the fan is positioned to supply cooling air to the sensor that exits through an outlet air vent of the housing, wherein the fan includes a tap to supply airflow to the second nozzle aimed at the surface of the sensor.

11. The assembly of claim 1,
wherein the fan is activatable to supply cooling airflow to the sensor at all speeds of the vehicle.

12. The assembly of claim 1,
wherein the fan is mounted at a rearward location with respect to the sensor and coupled to an outlet air vent, the controller being programmed to instruct the fan to rotate at a rotational speed based on a speed of the vehicle.

13. The assembly of claim 1,
wherein the fan is mounted at a rearward location with respect to the sensor and coupled to an outlet air vent, the controller being programmed to instruct the fan to rotate at a rotational speed that decreases responsive to a speed of the vehicle increasing.

14. The assembly of claim 1,
wherein the fan is mounted at a rearward location with respect to the sensor and coupled to an outlet vent, the fan having a tap to supply airflow to the second nozzle.

15. The assembly of claim 1,
wherein the fan is positioned to draw airflow into the housing, the controller being programmed to instruct the fan to draw the airflow into the housing based on the vehicle attaining a threshold vehicle speed.

16. The assembly of claim 1, wherein the housing is mounted above a windshield of the vehicle.

17. The assembly of claim 1, wherein the housing is mounted proximate to a forward edge of the vehicle roof.

18. The assembly of claim 1, wherein the first nozzle is fluidly coupled to a windshield washer fluid reservoir.

19. An assembly, comprising:
a housing shaped to be mounted to a vehicle;
a sensor within the housing, the sensor having a field of view in a forward direction relative to the vehicle;
a first nozzle mounted on the housing and below the sensor, the first nozzle being positioned to dispense a fluid in an upward direction to a surface of the sensor;
a second nozzle mounted below the sensor, the second nozzle positioned to dispense airflow to the surface of the sensor;
a ram air structure positioned to receive airflow during forward travel of the vehicle and to dispense airflow to the surface of the sensor; and
a fan mounted at a rearward location with respect to the sensor and coupled to an outlet air vent, the fan being coupled to a controller programmed to instruct the fan to rotate at a rotational speed based on a speed of the vehicle.

20. The assembly of claim 19, wherein the fan is coupled to an outlet vent and wherein the fan includes a tap to supply airflow to the second nozzle.

21. An assembly, comprising:
a housing shaped to be mounted to a vehicle;
a sensor within the housing, the sensor having a field of view in a forward direction relative to the vehicle;
a first nozzle mounted on the housing and below the sensor, the first nozzle being positioned to dispense a fluid in an upward direction to a surface of the sensor;
a second nozzle mounted below the sensor, the second nozzle positioned to dispense airflow to the surface of the sensor;
a ram air structure positioned to receive airflow during forward travel of the vehicle and to dispense airflow to the surface of the sensor; and
a fan mounted at a rearward location with respect to the sensor and coupled to an outlet air vent, the fan being coupled to a controller programmed to instruct the fan to rotate at a rotational speed that decreases responsive to a speed of the vehicle increasing.

22. The assembly of claim 21, wherein the housing is mounted above the windshield of the vehicle and proximate to a forward edge of the vehicle roof.

23. An assembly, comprising:
a housing shaped to be mounted to a vehicle;
a sensor within the housing, the sensor having a field of view in a forward direction relative to the vehicle;
a first nozzle mounted on the housing and below the sensor, the first nozzle being positioned to dispense a fluid in an upward direction to a surface of the sensor;
a second nozzle mounted below the sensor, the second nozzle positioned to dispense airflow to the surface of the sensor;
a ram air structure positioned to receive airflow during forward travel of the vehicle and to dispense airflow to the surface of the sensor; and
a fan positioned to draw airflow into the housing, the fan additionally being coupled to a controller programmed to instruct the fan to draw the airflow into the housing based on a wheel speed of the vehicle and programmed to deactivate cleaning airflow from the fan to the sensor responsive to the vehicle attaining a threshold speed.

* * * * *